United States Patent
Wu

(10) Patent No.: US 10,257,757 B2
(45) Date of Patent: Apr. 9, 2019

(54) DEVICE AND METHOD OF HANDLING CONNECTION TRANSFER

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 85 days.

(21) Appl. No.: 15/473,625

(22) Filed: Mar. 30, 2017

(65) Prior Publication Data

US 2017/0289877 A1 Oct. 5, 2017

Related U.S. Application Data

(60) Provisional application No. 62/316,589, filed on Apr. 1, 2016.

(51) Int. Cl.

| | | |
|---|---|---|
| *H04W 4/70* | (2018.01) | |
| *H04W 36/00* | (2009.01) | |
| *H04W 36/08* | (2009.01) | |
| *H04W 48/12* | (2009.01) | |
| *H04W 76/27* | (2018.01) | |

(52) U.S. Cl.
CPC ............. *H04W 36/08* (2013.01); *H04W 4/70* (2018.02); *H04W 36/0055* (2013.01); *H04W 48/12* (2013.01); *H04W 76/27* (2018.02)

(58) Field of Classification Search
CPC ........... H04W 72/0446; H04W 72/042; H04W 72/1242; H04W 72/1289; H04L 1/1812
See application file for complete search history.

(56) References Cited

U.S. PATENT DOCUMENTS

| | | | |
|---|---|---|---|
| 2014/0226615 A1* | 8/2014 | Beale | H04W 28/20 370/329 |
| 2017/0318478 A1* | 11/2017 | Basu Mallick | H04W 4/70 |
| 2018/0070403 A1* | 3/2018 | Uemura | H04W 4/04 |

OTHER PUBLICATIONS

Search Report dated Sep. 29, 2017 for EP application No. 17163852. 1, pp. 1-9.
3GPP TS 36.300 V13.3.0 (Mar. 2016), "Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", XP002773036, pp. 81-86.

(Continued)

*Primary Examiner* — Jung H Park
(74) *Attorney, Agent, or Firm* — Winston Hsu

(57) ABSTRACT

A first base station (BS) for handling a connection transfer with a second BS comprises a storage unit for storing instructions and a processing circuit coupled to the storage unit. The processing circuit is configured to execute the instructions stored in the storage unit. The instructions comprise determining to configure a first communication device to be in a light radio resource control (RRC) connected mode; generating a first RRC message configuring the first communication device to be in the light RRC connected mode; generating a first connection transfer message comprising first system information, when the first communication device is in coverage enhancement (CE) or a type of the first communication device is a first type; and generating the first connection transfer message comprising second system information, when the first communication device is not in CE or the type of the first communication device is a second type.

15 Claims, 8 Drawing Sheets

(56) References Cited

OTHER PUBLICATIONS

3GPP TR 36.824 V11.0.0 (Jun. 2012), "3rd Generation Partnership Project; Technical Specification Group Radio Access Network; Evolved Universal Terrestrial Radio Access (E-UTRA); LTE coverage enhancements (Release 11)", XP050580750, pp. 1-18.
3GPP TR 23.720 V13.0.0 (Mar. 2016), "3rd Generation Partnership Project; Technical Specification Group Services and System Aspects; Study on architecture enhancements for Cellular Internet of Things (Release 13)", XP051087943, pp. 1-94.
3GPP TS 36.300 V13.2.0 (Dec. 2015) Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13).

\* cited by examiner

DEVICE AND METHOD OF HANDLING CONNECTION TRANSFER

CROSS REFERENCE TO RELATED APPLICATIONS

This application claims the benefit of U.S. Provisional Application No. 62/316,589 filed on Apr. 1, 2016, which is incorporated herein by reference.

BACKGROUND OF THE INVENTION

1. Field of the Invention

The present invention relates to a device and a method used in a wireless communication system, and more particularly, to a device and a method of handling a connection transfer.

2. Description of the Prior Art

A long-term evolution (LTE) system provides high data rate, low latency, packet optimization, and improved system capacity and improved coverage. The LTE system is evolved continuously to increase peak data rate and throughput by using advanced techniques, such as carrier aggregation (CA), dual connectivity, licensed-assisted access, etc. In the LTE system, a radio access network known as an evolved universal terrestrial radio access network (E-UTRAN) includes at least one evolved Node-B (eNB) for communicating with at least one user equipment (UE), and for communicating with a core network. The core network may include a mobility management and a Quality of Service (QoS) control of the at least one UE.

A UE is connected to a first eNB in coverage enhancement (CE) via a cell of the first eNB. It is not clear how the first eNB can perform a connection transfer for the UE in from the first eNB to a second eNB.

SUMMARY OF THE INVENTION

The present invention therefore provides a communication device and method for handling a connection transfer to solve the abovementioned problem.

A first base station (BS) for handling a connection transfer with a second BS comprises a storage unit for storing instructions and a processing circuit coupled to the storage unit. The processing circuit is configured to execute the instructions stored in the storage unit. The instructions comprise connecting to a first communication device; determining to configure the first communication device to be in a light radio resource control (RRC) connected mode; generating a first RRC message configuring the first communication device to be in the light RRC connected mode in response to the determination; generating a first connection transfer message comprising first system information, when the first communication device is in coverage enhancement (CE) or a type of the first communication device is a first type; generating the first connection transfer message comprising second system information, when the first communication device is not in CE or the type of the first communication device is a second type; and transmitting the first connection transfer message to the second BS; transmitting the first RRC message to the first communication device.

A second base station (BS) for handling a connection transfer with a first BS comprises a storage unit for storing instructions and a processing circuit coupled to the storage unit. The processing circuit is configured to execute the instructions stored in the storage unit. The instructions comprise connecting to the first BS; receiving a connection request message from a communication device; transmitting a connection transfer request message to the first BS in response to the connection request message; receiving a connection transfer message from the first BS, wherein the connection transfer message is transmitted by the first BS in response to the connection transfer request message, and the connection transfer message comprises a communication device configuration of the communication device and at least one of first system information and second system information; generating a connection response message comprising a first configuration generated according to the first system information, if the connection transfer message comprises the first system information and the communication device is in coverage enhancement (CE) or a type of the communication device is a first type; generating the connection response message comprising a second configuration generated according to the second system information, if the connection transfer message comprises the second system information and the communication device is not in CE or the type of the communication device is a second type; and transmitting the connection response message to the communication device in response to the connection request message.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
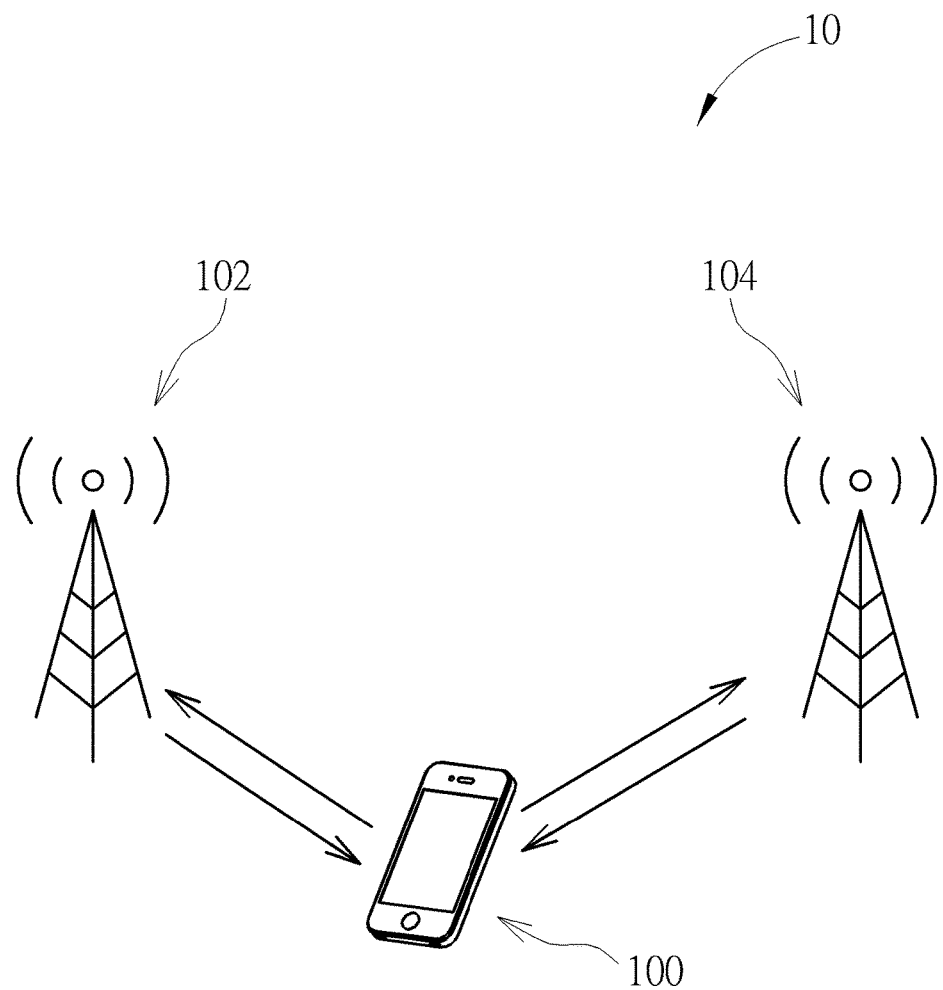
FIG. 1 is a schematic diagram of a wireless communication system according to an example of the present invention.

FIG. 1 is a schematic diagram of a wireless communication system 10 according to an example of the present invention. The wireless communication system 10 is composed of a communication device 100, base stations (BSs) 102 and 104. In FIG. 1, the communication device 100, the BSs 102 and 104 and are utilized for illustrating the structure of the wireless communication system 10. Practically, each of the BSs 102 and 104 may be an evolved NB (eNB) or a fifth generation (5G) (or called new radio (NR)) BS. The 5G (or NR) BS supports orthogonal frequency-division multiplexing (OFDM) and/or non-OFDM, a transmission time interval (TTI) shorter than 1 ms (e.g., 100 or 200 microseconds) and a wider system bandwidth (e.g., 200 MHz). In FIG. 1, coverage areas of the BS 102 and the BS 104 may be overlapped or non-overlapped. In general, a BS may also be used to refer any of the eNB and the 5G BS.

The communication device 100 may be a user equipment (UE), a mobile phone, a laptop, a tablet computer, an electronic book, a portable computer system, a vehicle, or an airplane. For uplink (UL), the communication device 100 is the transmitter and the BS 102 and/or the BS 104 is the receiver, and for downlink (DL), the BS 102 and/or the BS 104 is the transmitter and the communication device 100 is the receiver.

The communication device 100 may be a bandwidth reduced low complexity (BL) communication device by which the maximum bandwidth for transmission and reception is operated is lower than a system bandwidth operated by the BS. For example, the BL communication device operates in any LTE system bandwidth (e.g., 3, 5, 10, 15 or 20 MHz) but with a limited channel bandwidth of 6 physical resource blocks (PRBs) (corresponding to the maximum channel bandwidth available in a 1.4 MHz LTE system) in DL and UL.

The communication device 100 in coverage enhancement (CE) uses enhanced coverage functionality (e.g., transmit multiple repetitions of data and/or signal, and/or receive multiple repetitions of data and/or signal) to access a cell of the BS 102 or the BS 104.

Figure 2:
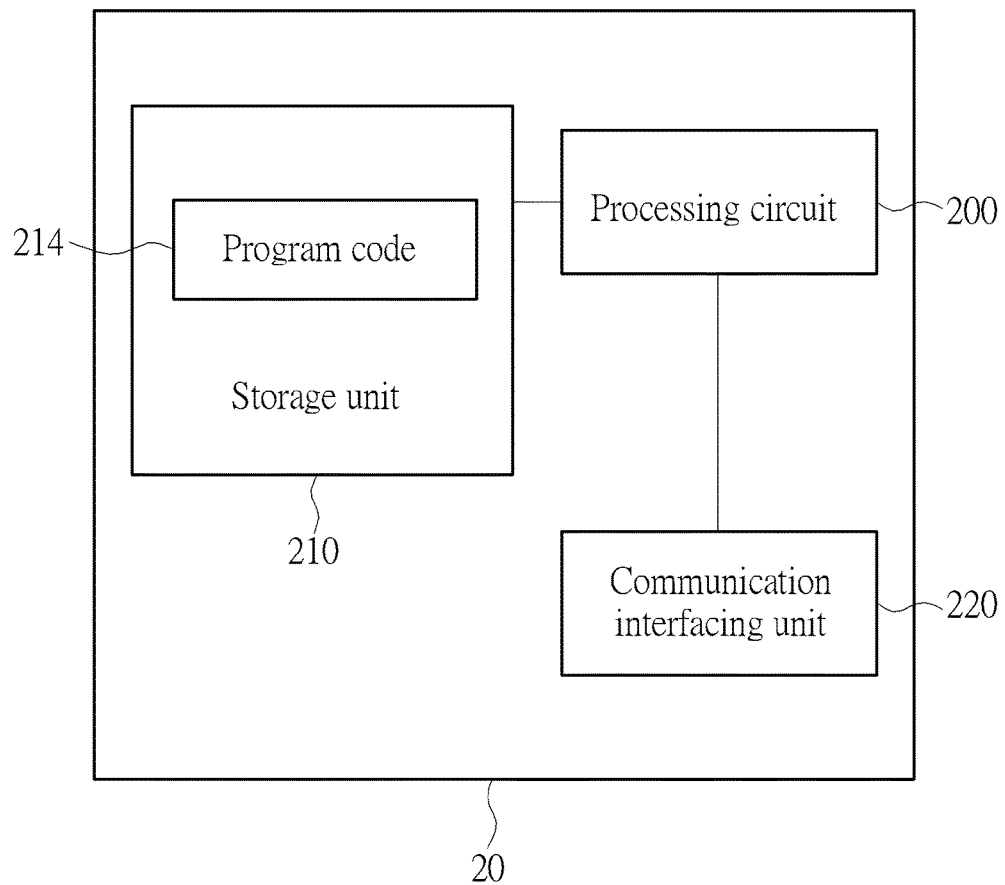
FIG. 2 is a schematic diagram of a communication device according to an example of the present invention.

FIG. 2 is a schematic diagram of a communication device 20 according to an example of the present invention. The communication device 20 may be the communication device 100, the BS 102 and/or the BS 104 shown in FIG. 1, but is not limited herein. The communication device 20 includes a processing circuit 200 such as a microprocessor or Application Specific Integrated Circuit, a storage unit 210 and a communication interfacing unit 220. The storage unit 210 may be any data storage device that stores a program code 214, accessed and executed by the processing circuit 200. Examples of the storage unit 210 include but are not limited to read-only memory, flash memory, random-access memory, hard disk, optical data storage device, non-volatile storage unit, non-transitory computer-readable medium (e.g., tangible media), etc. The communication interfacing unit 220 is preferably a transceiver used to transmit and receive signals (e.g., data, signals, messages and/or packets) according to processing results of the processing circuit 200.

In the following embodiments, a UE is used to represent the communication device 100 in FIG. 1, to simplify the illustration of the embodiments.

Figure 3:
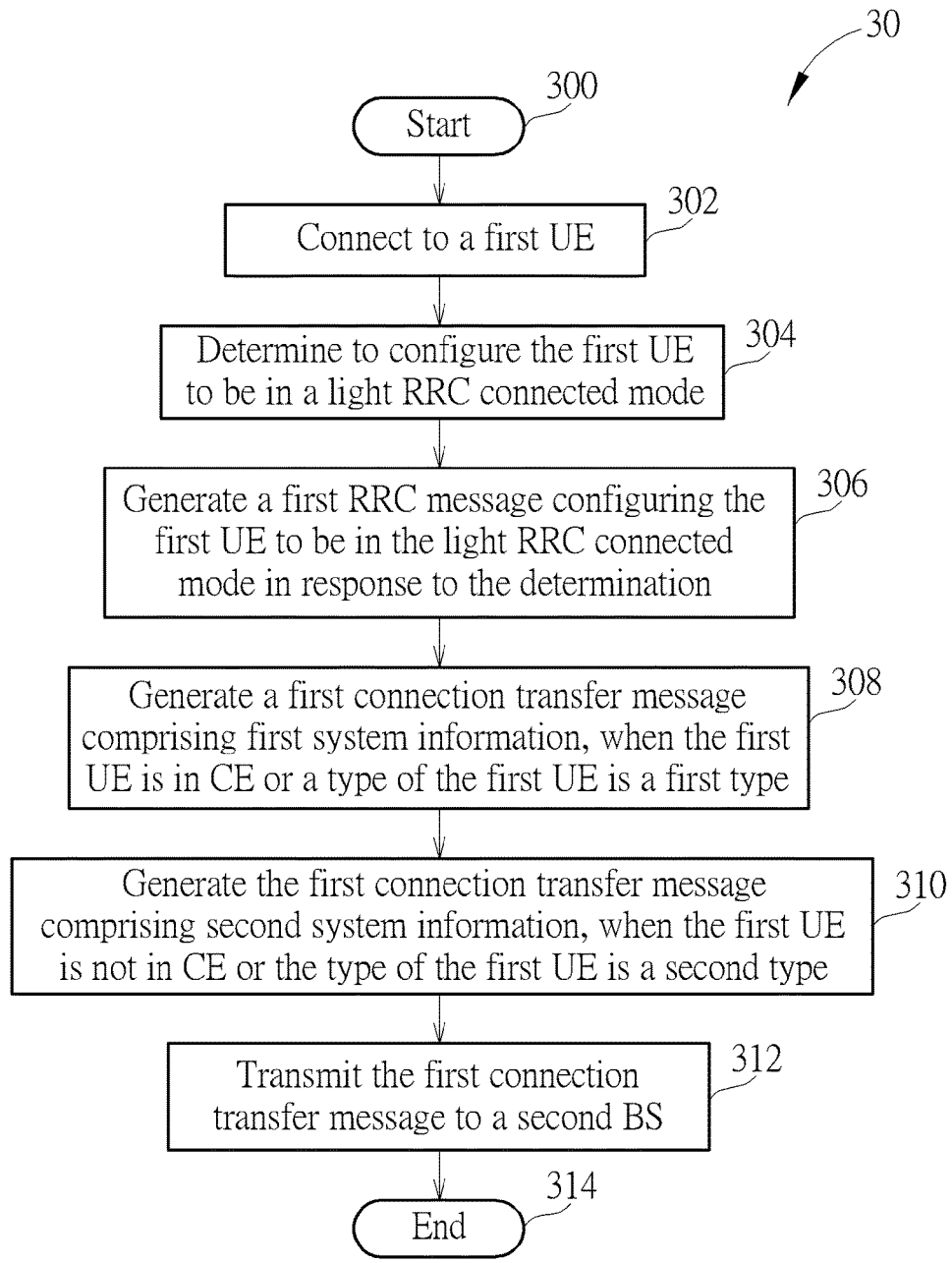
FIG. 3 is a flowchart of a process according to an example of the present invention.

FIG. 3 is a flowchart of a process 30 according to an example of the present invention. The process 30 may be utilized in a first BS (e.g., the BS 102). The process 30 includes the following steps:

Step 300: Start.

Step 302: Connect to a first UE.

Step 304: Determine to configure the first UE to be in a light radio resource control (RRC) connected mode.

Step 306: Generate a first RRC message configuring the first UE to be in the light RRC connected mode in response to the determination.

Step 308: Generate a first connection transfer message comprising first system information, when the first UE is in CE or a type of the first UE is a first type.

Step 310: Generate the first connection transfer message comprising second system information, when the first UE is not in CE or the type of the first UE is a second type.

Step 312: Transmit the first connection transfer message to a second BS.

Step 314: End.

According to the process 30, the first BS connects to a first UE (e.g., the communication device 100), and determines to configure the first UE to be in a light RRC connected mode. The first BS generates a first RRC message configuring the first UE to be in the light RRC connected mode in response to the determination. Then, the first BS generates a first connection transfer message comprising first system information, when the first UE is in CE or a type of the first UE is a first type (i.e., a UE with the first type or a first-type UE). The first BS generates the first connection transfer message comprising second system information, when the first UE is not in CE or the type of the first UE is a second type (i.e., a UE with the second type or a second-type UE). Accordingly, the first BS transmits the first connection transfer message to a second BS (e.g., the BS 104), and transmits the first RRC message to the first UE. That is, whether a UE is in CE or a type of the UE is used for determining content of a connection transfer message for handling a connection transfer.

In one example, the first BS transmits the first connection transfer message to a second BS, when receiving a first connection transfer request message from the second BS.

Realization of the process 30 is not limited to the above description. The following examples may be applied to the process 30.

In one example, the RRC message or the first connection transfer request message may include an identity (e.g., UE identity) for the first BS to identify the first UE. After the first UE receives the first RRC message, the first UE may reselect a cell of the second BS and transmit a connection request message to the second BS via the cell of the second BS.

In one example, the first type is a first category (e.g., category M1), and the second type is a second category (e.g., non-category M1 category, such as category 6). In one example, the first type is a (massive) machine type communication ((m)MTC), and the second type is an (evolved) mobile broad band ((e)MBB). In one example, the first type is an Ultra-Reliable and Low Latency Communications (uRLLC), and the second type is an (e)MBB. In one example, a first radio frequency (RF) capability of the first type and a second RF capability of the second type have different maximum bandwidths for transmission and reception. For example, a UE with the first type is capable of receiving maximum 1.4 MHz (e.g., BL UE), and a UE with the second type is capable of receiving maximum 20 MHz (e.g., not a BL UE). For example, the UE with the first type is capable of receiving maximum 20 MHz (e.g., supports bandwidth class 3), and the UE with the second type is capable of receiving maximum 100 MHz (e.g., supports bandwidth class 5).

In one example, the first BS generates the connection transfer message comprising the first system information, when the first UE is in CE or the type of the first UE is the first type. The first BS connects to a second UE, and determines to configure the second UE to be in the light RRC connected mode. Then, the first BS generates a second RRC message configuring the second UE to be in the light RRC connected mode in response to the determination. The first BS generates a second connection transfer message comprising the second system information, when the second UE is not in CE or the type of the second UE is the second type. Accordingly, the first BS transmitting the second connection transfer message to the second BS, and transmits the second RRC message to the second UE. In other words, the process 30 can be applied to the connection transfers of multiple UEs.

In one example, each of the first and second connection transfer messages includes a UE configuration of the first UE. Further, the UE configuration includes at least one of a security configuration, a measurement configuration and a data radio bearer (DRB) configuration. The UE configuration includes at least one of a security configuration, a measurement configuration and a DRB configuration.

In one example, the first system information includes at least one first system information block (SIB) for the UE in CE or the first type UE, and the second system information may include at least one second SIB for the UE not in CE or the second type UE. In one example, the at least one first SIB includes a SystemInformationBlockType1-BR, and the at least one second SIB includes a SystemInformationBlockType1. In one example, the at least one first SIB includes a first SystemInformationBlockType2, and the at least one second SIB includes a second SystemInformationBlockType2. For example, the first SystemInformationBlockType2 may be included in SystemInformation-BR in a BCCH-DL-SCH-Message-BR transmitted by the first BS, and the second SystemInformationBlockType2 may be included in SystemInformation in BCCH-DL-SCH-Message transmitted by the first BS.

In one example, the first system information includes at least one IE which is not comprised in the second system information. In one example, the first and second system information includes an IE. The IE in the first system information and the IE in the second system information may have the same value or different values.

In one example, the first system information is broadcasted by the first BS for the first UE with the first type and/or for the first UE in CE. The second system information is broadcasted by the first BS for the first UE with the second type and/or for the first UE not in CE. In one example, the first system information and the second system information is broadcasted by the first BS indifferent frequency resources and/or different time in a same carrier. For example, the first system information is transmitted within 1.4 MHz bandwidth in the same carrier (e.g., 20 MHz) for a UE with the first type UE, and the second system information is transmitted within more than 1.4 MHz bandwidth in the same carrier. For example, the first system information may be transmitted in more repetitions than the second system information in the same carrier.

Figure 4:
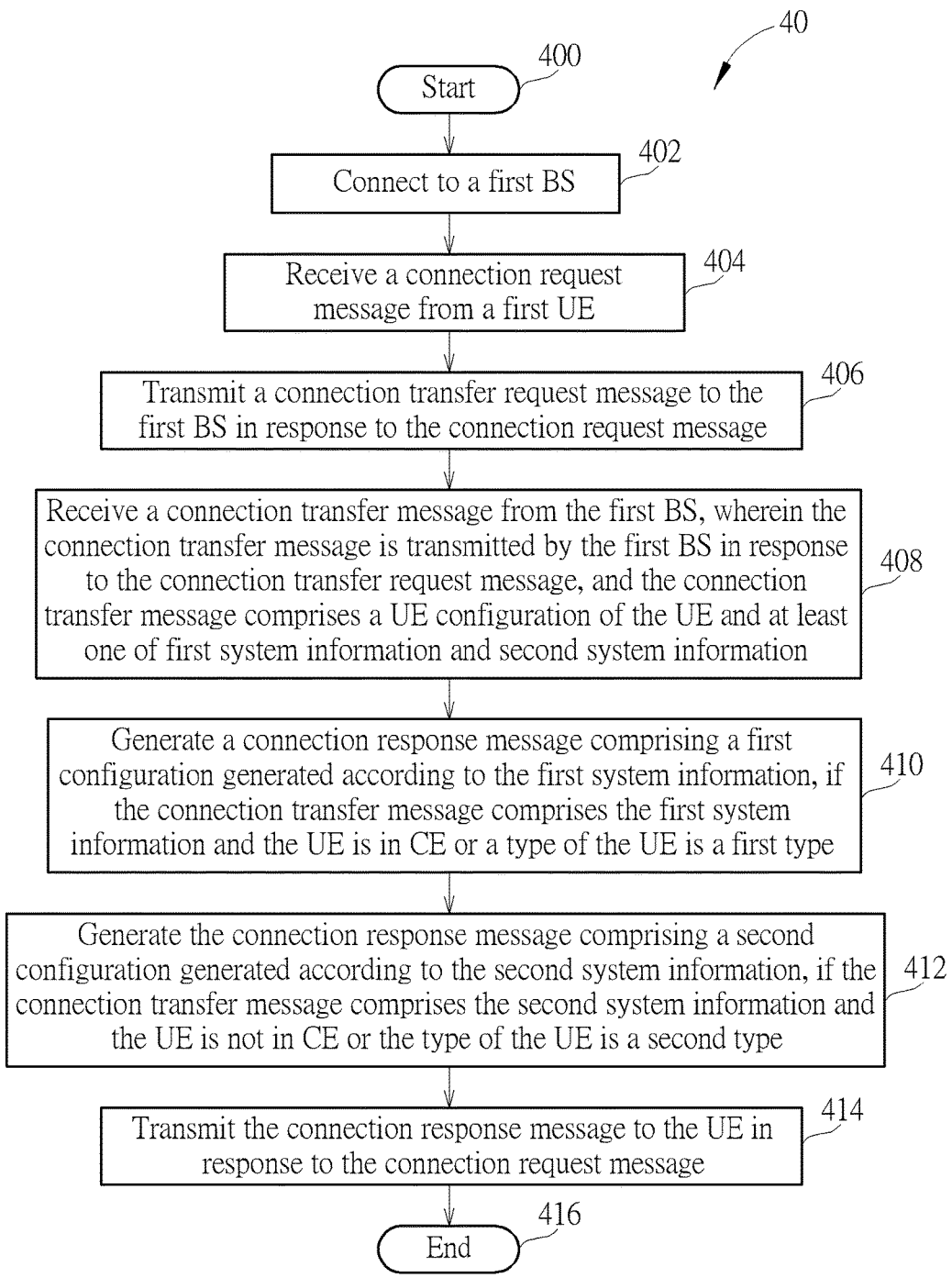
FIG. 4 is a flowchart of a process according to an example of the present invention.

FIG. 4 is a flowchart of a process 40 according to an example of the present invention. The process 40 may be utilized in a second BS (e.g., the BS 104). The process 40 includes the following steps:

Step 400: Start.

Step 402: Connect to a first BS.

Step 404: Receive a connection request message from a first UE.

Step 406: Transmit a connection transfer request message to the first BS in response to the connection request message.

Step 408: Receive a connection transfer message from the first BS, wherein the connection transfer message is transmitted by the first BS in response to the connection transfer request message, and the connection transfer message comprises a UE configuration of the UE and at least one of first system information and second system information.

Step 410: Generate a connection response message comprising a first configuration generated according to the first system information, if the connection transfer message comprises the first system information and the UE is in CE or a type of the UE is a first type.

Step 412: Generate the connection response message comprising a second configuration generated according to the second system information, if the connection transfer message comprises the second system information and the UE is not in CE or the type of the UE is a second type.

Step 414: Transmit the connection response message to the UE in response to the connection request message.

Step 416: End.

According to the process 40, the second BS connects to a first BS (e.g., the BS 102). The second BS receives a connection request message from a first UE, and transmits a connection transfer request message to the first BS in response to the connection request message. Then, the second BS receives a connection transfer message from the first BS, wherein the connection transfer message is transmitted by the first BS in response to the connection transfer request message, and the connection transfer message comprises a UE configuration of the UE and at least one of first system information and second system information. The second BS generates a connection response message comprising a first configuration generated according to the first system information, if the connection transfer message comprises the first system information and the UE is in CE or a type of the UE is a first type. The second BS generates the connection response message comprising a second configuration generated according to the second system information, if the connection transfer message comprises the second system information and the UE is not in CE or the type of the UE is a second type. Accordingly, the second BS transmits the connection response message to the UE in response to the connection request message.

Realization of the process 40 is not limited to the above description. The following examples may be applied to the process 40.

In one example, the first configuration and the second configuration are different. In one example, the first configuration is for updating a first value comprised in the first system information, and the second configuration is for updating a second value comprised in the second system information. In one example, the first configuration configures a third configuration which is not comprised in the first system information, and the second configuration configures a fourth configuration which is not comprised in the second system information.

In one example, the first configuration includes a first RadioResourceConfigCommon information element (IE), and the second configuration includes a second RadioResourceConfigCommon IE. In one example, the first RadioResourceConfigCommon includes an IE which is not comprised in the second RadioResourceConfigCommon. In one example, the first RadioResourceConfigCommon and the second RadioResourceConfigCommon have at least one of a second IE and a third IE. The second IE of the first RadioResourceConfigCommon and the second IE of the second RadioResourceConfigCommon have different values. In one example, the third IE of the first RadioResourceConfigCommon and the third IE of the second RadioResourceConfigCommon have the same value.

In one example, the first configuration includes a first RLF-TimersAndConstants IE, and the second configuration includes a second RLF-TimersAndConstants IE. In one example, the first RLF-TimersAndConstants includes a first IE which is not comprised in the second RLF-TimersAndConstants. In one example, the first RLF-TimersAndConstants and the second RLF-TimersAndConstants have at least one of a second UE and a third IE. The second IE of the first RLF-TimersAndConstants and the second IE of the second RLF-TimersAndConstants have different values. In one example, the third IE of the first RLF-TimersAndConstants and the third IE of the second RLF-TimersAndConstants have the same value.

In one example, the connection request message is a RRC connection reestablishment request message, and the connection response message is a RRC connection reestablishment message. In one example, the connection request message is a RRC connection request message, and the connection response message is a RRC connection setup message. In one example, the connection request message is a RRC connection resume request message, and the connection response message is a RRC connection resume message.

In one example, the connection request message is a cell update message or a connection update message which is newly defined for a mobility enhancement in a 3rd Generation Partnership Project (3GPP) standard, and the connection response message is a cell update confirm message or a connection update confirm message which is newly defined for the mobility enhancement in the 3GPP standard. In one example, the connection request message is a cell update request message or a connection update request message which is newly defined for a mobility enhancement in a 3GPP standard, and the connection response message is a cell update message or a connection update message which is newly defined for the mobility enhancement in the 3GPP standard.

In the mobility enhancement, the UE may be in a RRC connected mode, and may have UE-controlled mobility. This may be defined as a light RRC connected mode. When the UE in the light RRC connected mode moves from coverage of a cell of the first BS to coverage of a cell of the second BS, the UE transmits a connection request message to the second BS via the cell of the second BS. The second BS transmits a connection response message in response to the connection request message. The connection response message may include at least one of a security configuration, a SRB configuration, a DRB configuration and a radio resource configuration.

Figure 5:
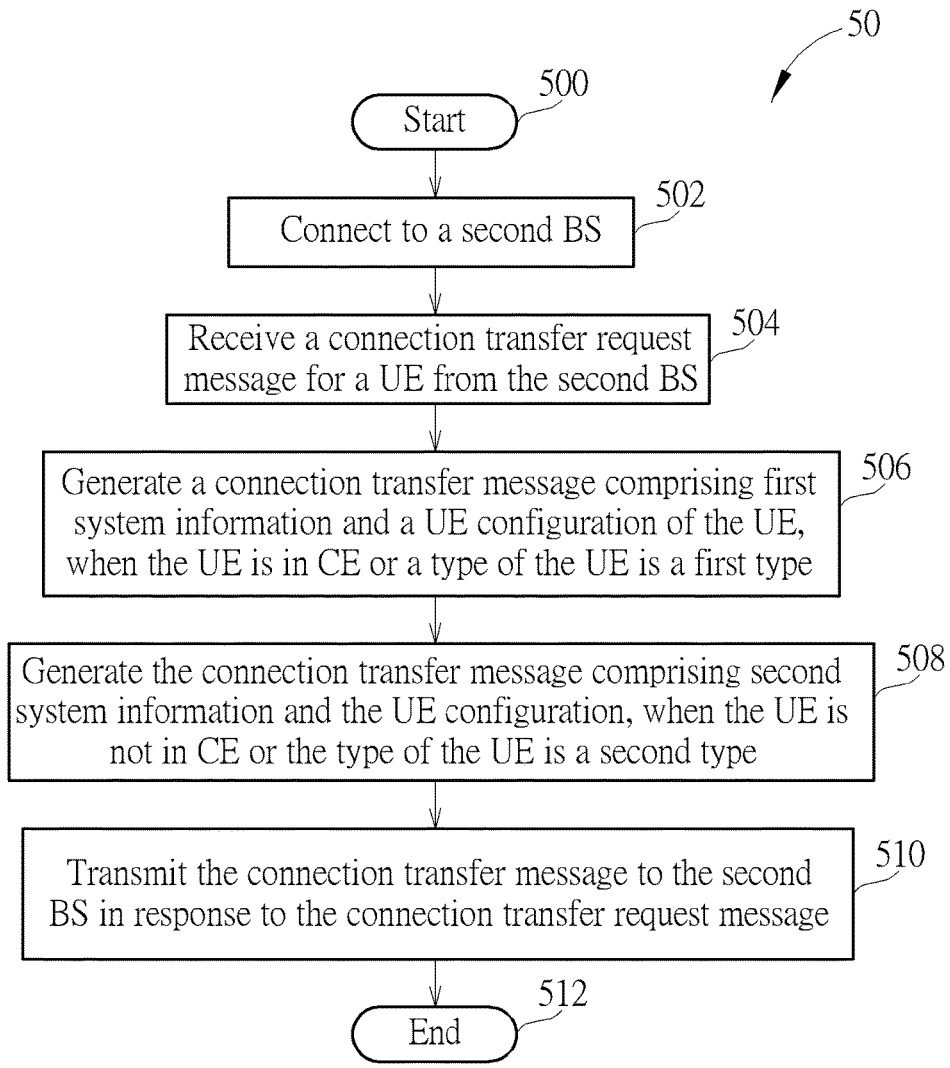
FIG. 5 is a flowchart of a process according to an example of the present invention.

FIG. 5 is a flowchart of a process 50 according to an example of the present invention. The process 50 may be utilized in a first BS (e.g., the BS 102). The process 50 includes the following steps:

Step 500: Start.

Step 502: Connect to a second BS.

Step 504: Receive a connection transfer request message for a UE from the second BS.

Step 506: Generate a connection transfer message comprising first system information and a UE configuration of the UE, when the UE is in CE or a type of the UE is a first type.

Step 508: Generate the connection transfer message comprising second system information and the UE configuration, when the UE is not in CE or the type of the UE is a second type.

Step 510: Transmit the connection transfer message to the second BS in response to the connection transfer request message.

Step 512: End.

According to the process 50, the first BS connects to a second BS (e.g., the BS 104), and receives a connection transfer request message for a UE (e.g., the communication device 100) from the second BS. Then, the first BS generates a connection transfer message comprising first system information and a UE configuration of the UE, when the UE is (e.g., was) in CE or a type of the UE is a first type. The first BS generates the connection transfer message comprising second system information and the UE configuration, when the UE is (e.g., was) not in CE or the type of the UE is a second type. Accordingly, the first BS transmits the connection transfer message to the second BS in response to the connection transfer request message.

Figure 6:
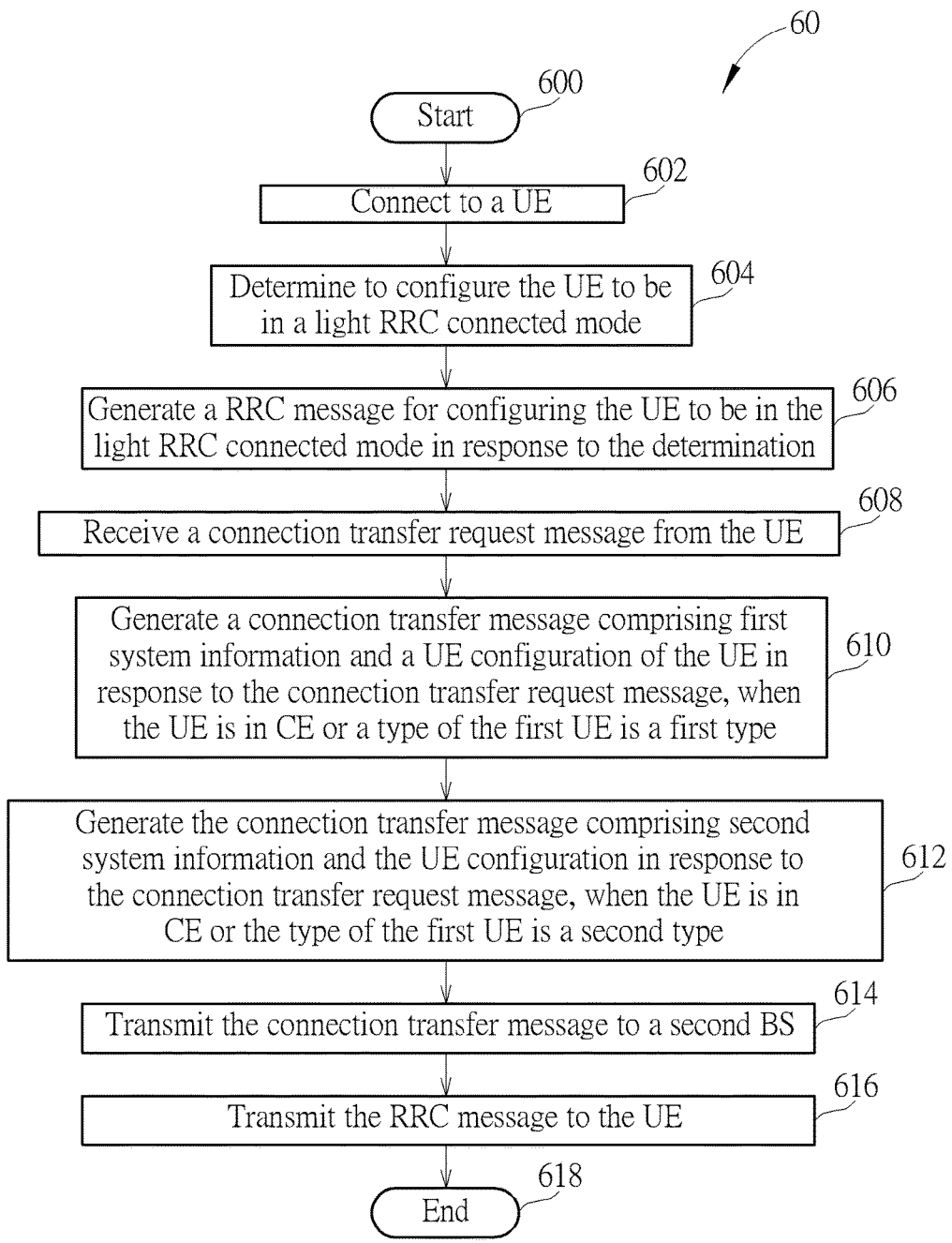
FIG. 6 is a flowchart of a process according to an example of the present invention.

FIG. 6 is a flowchart of a process 60 according to an example of the present invention. The process 60 may be utilized in a first BS (e.g., the BS 102). The process 60 includes the following steps:

Step 600: Start.

Step 602: Connect to a UE.

Step 604: Determine to configure the UE to be in a light RRC connected mode.

Step 606: Generate a RRC message for configuring the UE to be in the light RRC connected mode in response to the determination.

Step 608: Receive a connection transfer request message from the UE.

Step 610: Generate a connection transfer message comprising first system information and a UE configuration of the UE in response to the connection transfer request message, when the UE is in CE or a type of the first UE is a first type.

Step 612: Generate the connection transfer message comprising second system information and the UE configuration in response to the connection transfer request message, when the UE is in CE or the type of the first UE is a second type.

Step 614: Transmit the connection transfer message to a second BS.

Step 616: Transmit the RRC message to the UE.

Step 618: End.

According to the process 60, the first BS connects to a UE (e.g., the communication device 100), and determines to configure the UE to be in a light RRC connected mode. The first BS generates a RRC message for configuring the UE to be in the light RRC connected mode in response to the determination. The first BS receives a connection transfer request message from the UE. Then, the first BS generates a connection transfer message comprising first system information and a UE configuration of the UE in response to the connection transfer request message, when the UE is in CE or a type of the first UE is a first type. The first BS generates the connection transfer message comprising second system information and the UE configuration in response to the connection transfer request message, when the UE is in CE or the type of the first UE is a second type. Accordingly, the first BS transmits the connection transfer message to a second BS (e.g., the BS 104), and transmits the RRC message to the UE.

Figure 7:
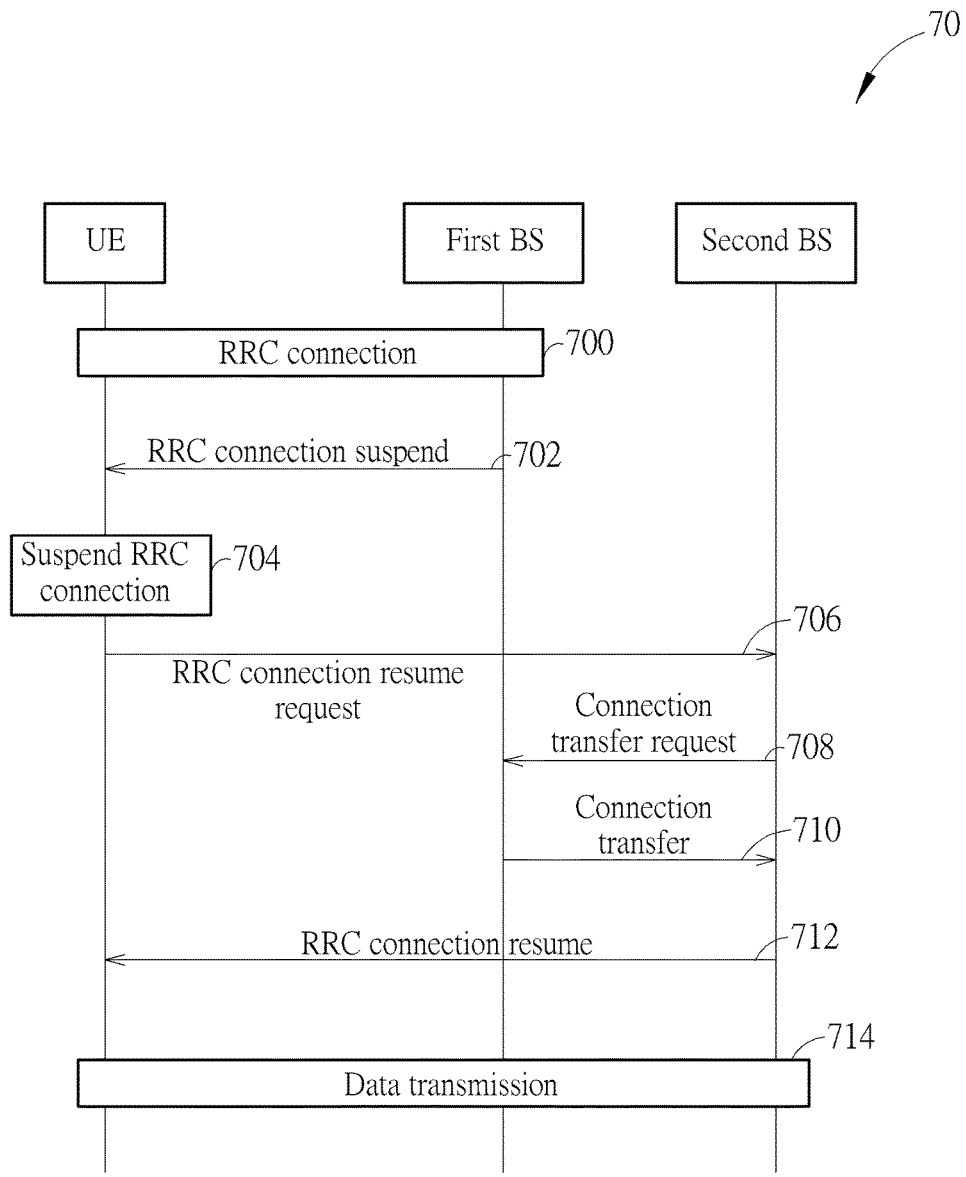
FIG. 7 is a sequence chart of a RRC suspend and resume procedure according to an example of the present invention.

FIG. 7 is a sequence chart 70 of a RRC suspend and resume procedure according to an example of the present invention. A UE (e.g., the communication device 100) has a RRC connection with a first BS (e.g., the BS 102) (Step 700). When the UE receives a RRC connection suspend message from a first BS (Step 702), the UE suspends the RRC connection which was established between the UE and first BS (Step 704). The RRC connection suspend message may be a RRC connection release message or a newly defined RRC message. The UE may move to coverage of a cell of a second BS (e.g., the BS 104). When the UE intends to perform data transmission, the UE transmits a RRC connection resume request message to the second BS (Step 706). When the second BS receives the RRC connection resume request message, the second BS transmits a connection transfer request message to the first BS to request the first BS to transmit a connection transfer message (Step 708). The first BS transmits the connection transfer message which includes a UE configuration of the UE and first system information and/or second system information to the second BS according to the previous examples (Step 710). Then, the second BS transmits a RRC connection resume message to the UE to resume the suspended RRC connection (Step 712). After the RRC connection is resumed, the UE can perform the data transmission with the second BS (Step 714).

Figure 8:
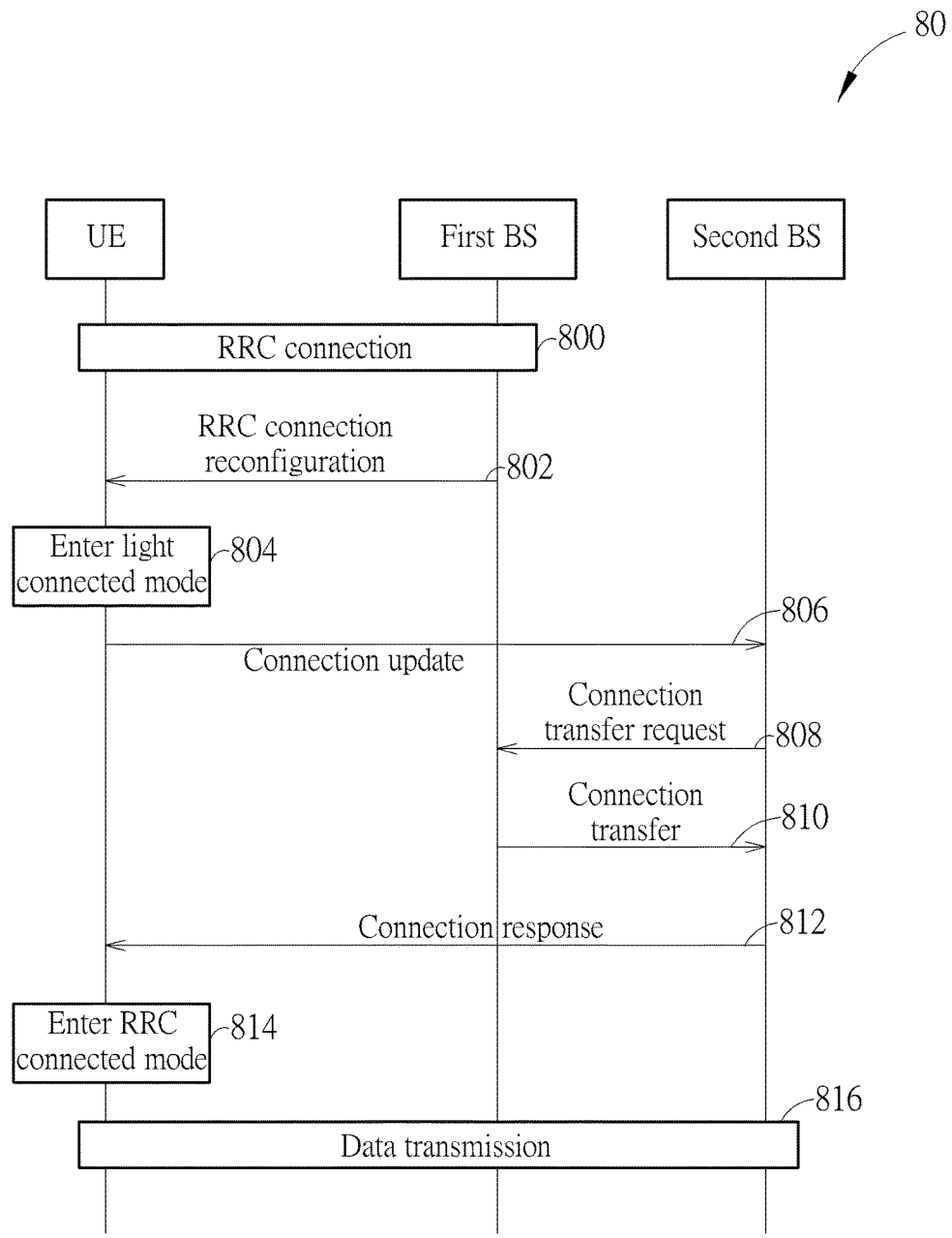
FIG. 8 is a sequence chart of a RRC suspend and resume procedure according to an example of the present invention.

FIG. 8 is a sequence chart 80 of a RRC suspend and resume procedure according to an example of the present invention. A UE (e.g., the communication device 100) has a RRC connection with a first BS (e.g., the BS 102) (Step 800). When a UE receives a RRC connection reconfiguration message from a first BS (Step 802), the UE enters a light RRC connected mode (Step 804) and performs a cell reselection. The UE may move to coverage of a cell of a second BS (e.g., the BS 104) due to the cell reselection. When the UE intends to perform data transmission, the UE transmits a connection update message to the second BS (Step 806). When the second BS receives a connection response message, the second BS transmits a connection transfer request to the first BS to request the first BS to transmit a connection transfer message (Step 808). The first BS transmits the connection transfer message which includes a UE configuration of the UE and first system information and/or second system information to the second BS according to the previous examples (Step 810). Then, the second BS transmits a connection response message to the UE (Step 812), to configure the UE to enter a RRC connected mode (i.e., not light RRC connected mode). Accordingly, the UE enters the RRC connected mode (Step 814), after receiving the connection response message. After entering the RRC connected mode, the UE can perform the data transmission with the second BS (Step 816).

It should be noted that the examples of the process 30, 40, 50 and/or 60 may be applied to each other and may be combined according to system requirements and design considerations, and are not limited herein. There may be correspondence between the process 30, 40, 50 and/or 60, but this is not a restriction for realizing the present invention.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the processes above may be compiled into the program code 214.

To sum up, the present invention provides a device and a method for handling a connection transfer. Whether a UE is in CE or a type of the UE is used for determining content of a connection transfer message or content of a connection response message for handling a connection transfer. Thus, the connection transfer can be performed adaptively according to a state of the UE or a type of the UE. Performance of the UE can be improved correspondingly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A first base station (BS) for handling a connection transfer with a second BS, comprising:
    a storage unit, for storing instructions of:
    connecting to a first communication device;
    determining to configure the first communication device to be in a light radio resource control (RRC) connected mode;
    generating a first RRC message configuring the first communication device to be in the light RRC connected mode in response to the determination;
    generating a first connection transfer message comprising first system information, when the first communication device is in coverage enhancement (CE) or a type of the first communication device is a first type;
    generating the first connection transfer message comprising second system information, when the first communication device is not in CE or the type of the first communication device is a second type; and
    transmitting the first connection transfer message to the second BS;
    transmitting the first RRC message to the first communication device; and
    a processing circuit, coupled to the storage unit, configured to execute the instructions stored in the storage unit.

2. The first BS of claim 1, wherein the first type is a first category and the second type is a second category, the first type is a (massive) machine type communication ((m)MTC) and the second type is a (evolved) mobile broad band ((e)MBB), or the first type is an Ultra-Reliable and Low Latency Communications (uRLLC) and the second type is an (e)MBB.

3. The first BS of claim 1, wherein a first radio frequency (RF) capability of the first type and a second RF capability of the second type are different.

4. The first BS of claim 1, wherein the first connection transfer message comprises a communication device configuration of the first communication device, and the communication device configuration comprises at least one of a security configuration, a measurement configuration and a data radio bearer (DRB) configuration.

5. The first BS of claim 1, wherein the first system information comprises at least one first system information block (SIB) for the first communication device in CE or the first communication device with the first type, and the second system information comprises at least one second SIB for the first communication device not in CE or the first communication device with the second type.

6. The first BS of claim 1, wherein the first system information comprises a first information element (IE) which is not comprised in the second system information.

7. The first BS of claim 1, wherein a second IE in the first system information and the second IE in the second system information have different values.

8. A second base station (BS) for handling a connection transfer with a first BS, comprising:
    a storage unit, for storing instructions of:
    connecting to the first BS;
    receiving a connection request message from a communication device;
    transmitting a connection transfer request message to the first BS in response to the connection request message;
    receiving a connection transfer message from the first BS, wherein the connection transfer message is transmitted by the first BS in response to the connection transfer request message, and the connection transfer message comprises a communication device configuration of the communication device and at least one of first system information and second system information;

generating a connection response message comprising a first configuration generated according to the first system information, if the connection transfer message comprises the first system information and the communication device is in coverage enhancement (CE) or a type of the communication device is a first type;

generating the connection response message comprising a second configuration generated according to the second system information, if the connection transfer message comprises the second system information and the communication device is not in CE or the type of the communication device is a second type; and transmitting the connection response message to the communication device in response to the connection request message; and a processing circuit, coupled to the storage unit, configured to execute the instructions stored in the storage unit.

9. The second BS of claim 8, wherein the first configuration is for updating a first value comprised in the first system information, and the second configuration is for updating a second value comprised in the second system information.

10. The second BS of claim 8, wherein the first configuration configures a third configuration which is not comprised in the first system information, and the second configuration configures a fourth configuration which is not comprised in the second system information.

11. The second BS of claim 8, wherein the first configuration comprises a first RadioResourceConfigCommon and the second configuration comprises a second RadioResourceConfigCommon, the first RadioResourceConfigCommon comprises a first information element (IE) which is not comprised in the second RadioResourceConfigCommon.

12. The second BS of claim 8, wherein the first configuration comprises a first RadioResourceConfigCommon and the second configuration comprises a second RadioResourceConfigCommon, and a second IE of the first RadioResourceConfigCommon and the second IE of the second RadioResourceConfigCommon have different values.

13. The second BS of claim 8, wherein the first configuration comprises a first RLF-TimersAndConstants, and the second configuration comprises a second RLF-TimersAndConstants, and the first RLF-TimersAndConstants comprises a first IE which is not comprised in the second RLF-TimersAndConstants.

14. The second BS of claim 8, wherein the first configuration comprises a first RLF-TimersAndConstants and the second configuration comprises a second RLF-TimersAndConstants, and a second IE of the first RLF-TimersAndConstants and the second IE of the second RLF-TimersAndConstants have different values.

15. The second BS of claim 8, wherein the connection request message is a radio resource control (RRC) connection reestablishment request message and the connection response message is a RRC connection reestablishment message, the connection request message is a RRC connection request message and the connection response message is a RRC connection setup message, or the connection request message is a RRC connection resume request message, and the connection response message is a RRC connection resume message.

* * * * *